United States Patent
You et al.

(10) Patent No.: US 10,009,882 B2
(45) Date of Patent: Jun. 26, 2018

(54) METHOD FOR RECEIVING SYSTEM INFORMATION BY MTC DEVICE LOCATED IN CELL COVERAGE-EXPANDED AREA

(71) Applicant: LG ELECTRONICS INC., Seoul (KR)

(72) Inventors: Hyangsun You, Seoul (KR); Dongyoun Seo, Seoul (KR); Yunjung Yi, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 14/888,901

(22) PCT Filed: May 9, 2014

(86) PCT No.: PCT/KR2014/004129
§ 371 (c)(1),
(2) Date: Nov. 3, 2015

(87) PCT Pub. No.: WO2014/185659
PCT Pub. Date: Nov. 20, 2014

(65) Prior Publication Data
US 2016/0088595 A1    Mar. 24, 2016

Related U.S. Application Data

(60) Provisional application No. 61/822,418, filed on May 12, 2013, provisional application No. 61/858,627, (Continued)

(51) Int. Cl.
*H04W 74/04* (2009.01)
*H04W 72/04* (2009.01)
(Continued)

(52) U.S. Cl.
CPC .......... *H04W 72/042* (2013.01); *H04L 5/0053* (2013.01); *H04L 5/0094* (2013.01);
(Continued)

(58) Field of Classification Search
CPC ... H04W 74/00; H04W 74/04; H04W 74/006; H04W 72/0446; H04W 72/042;
(Continued)

(56) References Cited

U.S. PATENT DOCUMENTS

2012/0282965 A1    11/2012  Kim et al.
2012/0327894 A1    12/2012  Axmon et al.
(Continued)

FOREIGN PATENT DOCUMENTS

CN    102792611 A    11/2012
CN    102823176 A    12/2012
(Continued)

OTHER PUBLICATIONS

Alcatel-Lucent et al., "(E)PDCCH coverage extension for MTC devices," 3GPP TSG-RAN WG1 Meeting #72bis, Chicago, USA, Apr. 15-19, 2013 (retrieved on Apr. 6, 2013), R1-130941, 4 pages.
(Continued)

*Primary Examiner* — Charles C Jiang
*Assistant Examiner* — Kyaw Z Soe
(74) *Attorney, Agent, or Firm* — Birch, Stewart, Kolasch & Birch, LLP

(57) ABSTRACT

According to one disclosure of the present specification, when a machine type communication (MTC) device is located in a coverage-expanded area of a base station, the MTC device repeatedly receives system information (for example, system information blocks (SIBs) of a first type) on several subframes and then combines and decodes the received SIBs, thereby improving a decoding success rate.

15 Claims, 26 Drawing Sheets

Related U.S. Application Data filed on Jul. 26, 2013, provisional application No. 61/862,519, filed on Aug. 6, 2013, provisional application No. 61/897,801, filed on Oct. 30, 2013, provisional application No. 61/916,283, filed on Dec. 15, 2013.

(51) Int. Cl.
*H04W 4/70* (2018.01)
*H04L 5/00* (2006.01)
*H04W 74/00* (2009.01)
*H04W 4/00* (2018.01)

(52) U.S. Cl.
CPC ............ *H04W 4/005* (2013.01); *H04W 4/70* (2018.02); *H04W 72/0446* (2013.01); *H04W 74/006* (2013.01); *H04W 74/04* (2013.01); *H04L 5/0033* (2013.01)

(58) Field of Classification Search
CPC .... H04W 4/005; H04W 72/04; H04L 5/0094; H04L 5/0053; H04L 5/0033
See application file for complete search history.

(56) References Cited

U.S. PATENT DOCUMENTS

| | | | |
|---|---|---|---|
| 2012/0327895 A1* | 12/2012 | Wallen et al. | H04W 48/12 370/330 |
| 2013/0028184 A1 | 1/2013 | Lee et al. | |
| 2013/0083753 A1 | 4/2013 | Lee et al. | |
| 2013/0100895 A1 | 4/2013 | Aghili et al. | |
| 2013/0136098 A1* | 5/2013 | Li | H04W 72/042 370/330 |
| 2014/0098761 A1* | 4/2014 | Lee | H04W 74/006 370/329 |
| 2014/0341141 A1* | 11/2014 | Nguyen | H04W 16/14 370/329 |

FOREIGN PATENT DOCUMENTS

| | | |
|---|---|---|
| CN | 102958025 A | 3/2013 |
| CN | 103052139 A | 4/2013 |
| KR | 10-2013-0020885 A | 3/2013 |
| WO | WO 2011/083997 A2 | 7/2011 |
| WO | WO 2011/119680 A3 | 9/2011 |
| WO | WO 2011/120007 A1 | 9/2011 |
| WO | WO 2012/173432 A2 | 12/2012 |

OTHER PUBLICATIONS

CATT, "Design of E-PDCCH search space," 3GPP TSG RAN WG1 Meeting #67, San Francisco, USA, Nov. 14-18, 2011 (retrieved on Nov. 9, 2011), R1-113743, 3 pages.

Fujitsu, "UE-specific search space location offset across DL component carriers", 3GPP TSG-RAN1 #61, Montreal, Canada, May 10-14, 2010 (retrieved on May 5, 2010), R1-103217, p. 1-2.

LG Electronics, "Cell Acquisition and Reference Signals for Coverage Limiting MTC UEs," 3GPP TSG RAN WG1#72, St Julian's, Malta, Jan. 28-Feb. 1, 2013 (retrieved on Jan. 18, 2013), R1-130263, p. 1-7.

LG Electronics, "Issue on handling of search space collision in case of cross-carrier scheduling," 3GPP TSG RAN WG1 #60bis, Beijing, China, Apr. 12-16, 2010 (retrieved on Apr. 6, 2010), R1-102411, 5 pages.

LG Electronics, "On the Necessity of Common Search Space on E-PDCCH," 3GPP TSG RAN WG1 Meeting #68bis, Jeju, Korea, Mar. 26-30, 2012 (retrieved on Mar. 20, 2012), R1-121454, p. 1-4.

LG Electronics, "PBCH and SIB Enhancement for Coverage-limiting UEs," 3GPP TSG RAN WG1 Meeting #72bis, Chicago, USA, Apr. 15-19, 2013 (retrieved on Apr. 6, 2013), R1-131296, 4 pages.

LG Electronics, "Text proposal for coverage enhancement of MTC UEs", R1-131294, 3GPP TSG RAN WG1 Meeting #72bis, Chicago, USA, Apr. 15-19, 2013, 7 pages.

LG Electronics, "Text Proposal on Coverage Enhancement for a MTC UE," R1-130264, 3GPP TSG RAN WG1 #72, St Julian's, Malta, Jan. 28-Feb. 1, 2013, 7 pages.

* cited by examiner

FIG. 6
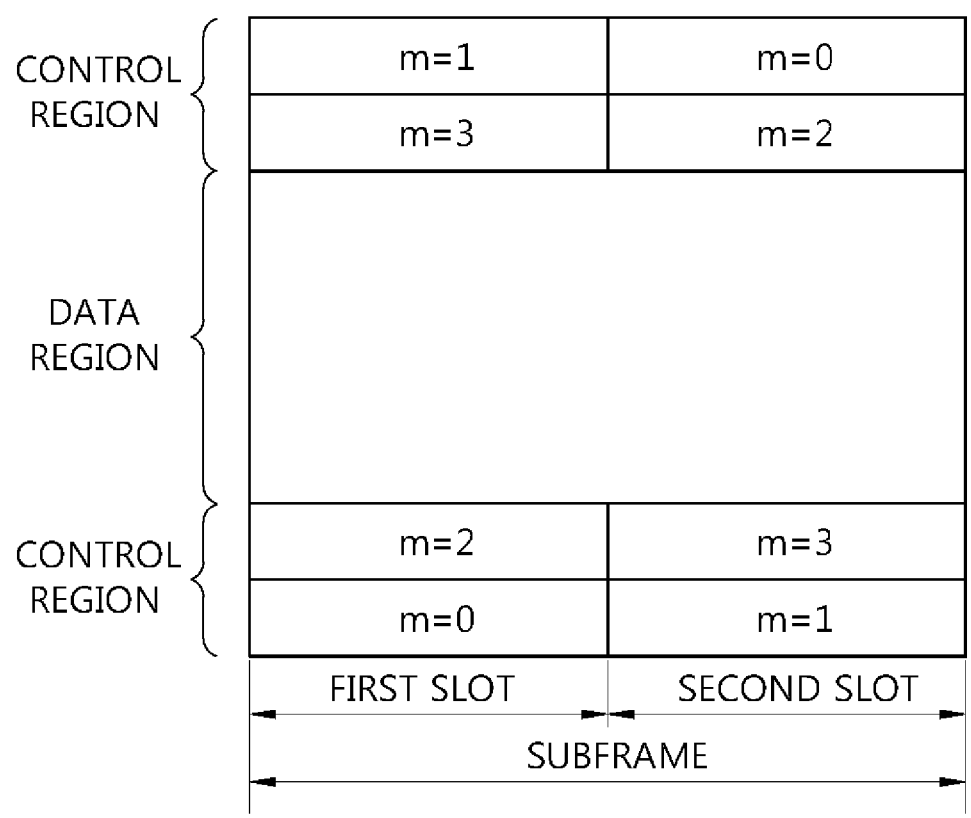
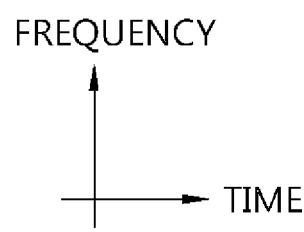

METHOD FOR RECEIVING SYSTEM INFORMATION BY MTC DEVICE LOCATED IN CELL COVERAGE-EXPANDED AREA

CROSS REFERENCE TO RELATED APPLICATIONS

This application is the National Phase of PCT International Application No. PCT/KR2014/004129,filed on May 9, 2014, which claims priority under 35 U.S.C. 119(e) to U.S. Provisional Application Nos. 61/822,418, 61/858,627, 61/862,519, 61/897,801, and 61/916,283, filed on May 12, 2013, Jul. 26, 2013, Aug. 6, 2013, Oct. 30, 2013, and Dec. 15,2013 respectively, all of which are hereby expressly incorporated by reference into the present application.

BACKGROUND OF THE INVENTION

Field of the invention
The present invention relates to mobile communication.
Related Art
3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V 10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, research into communication between devices or the device and a server without human interaction, that is, without human intervention, that is, machine type communication (MTC) has been actively conducted. The MTC represents a concept in which not a terminal used by human but a machine performs communication by using the existing wireless communication network.

Since a characteristic of the MTC is different from that of a general terminal, a service optimized for the MTC may be different from a service optimized for human to human communication. The MTC communication may be characterized as different market scenarios, data communication, small cost and little effort, potentially very many MTC device, a wide service area, and low traffic per MTC device as compared with a current mobile network communication service.

In recent years, expanding cell coverage has been considered for the MTC device and various techniques for expanding the cell coverage has been discussed. However, in the case where the coverage of the cell is expanded, when the base station transmits system information as transmitting the system information to legacy UE, the MTC device located in a cell coverage expanded area has a difficulty in receiving the system information.

SUMMARY OF THE INVENTION

Accordingly, the disclosure of the specification has been made in an effort to solve the problem.

In order to achieve the object, in detail, according to one disclosure of the present specification, when a machine type communication (MTC) device is located in a coverage expanded area of a base station, the MTC device repeatedly receives system information (e.g., a first type system information block (SIB)) on multiple subframes and thereafter, combines and decodes the repeatedly received system information.

In more detail, according to one disclosure of the present specification, there is provided a method for receiving system information. The method may performed by a machine type communication (MTC) device and comprise: decoding control information repeatedly received through physical downlink control channels (PDCCHs) on several subframes, the control information including scheduling information regarding a first type of a system information block (SIB) for the MTC device; and decoding the first type SIB for the MTC device repeatedly received through physical downlink shared channels (PDSCHs) on several subframes based on the scheduling information.

The first type SIB for the MTC device may include additional information in addition to information included in a first type SIB for a legacy user equipment (UE).

The method may further comprise: repeatedly receiving and decoding a master information block (MIB) through physical broadcast channels (PBCHs) on several subframes.

After a predetermined period from a last subframe among several subframes in which the MIB is received, the scheduling information and the first type SIB may be simultaneously received on several inconsecutive subframes.

The scheduling information may be received on several subframes after a first period from the last subframe among several subframes in which the MIB is received and the first type SIB is received on several subframes after a second period from a last subframe among several subframes in which the scheduling information is received.

After a predetermined period from the last subframe among several subframes in which the MIB is received, the scheduling information and the first type SIB may be simultaneously received on several consecutive subframes.

The method may further comprise: receiving the first type SIB for not the MTC device but the legacy UE. Here, in the decoding of the first type SIB for the MTC device, the first type SIB for the legacy UE and the first type SIB for the MTC device are combined and decoded.

The method may further comprise: receiving the first type SIB for not the MTC device but the legacy UE. Here, the first type SIB for the MTC device and the first type SIB for the legacy UE are received on different RBs on the same subframes.

According to one disclosure of the present specification, there is also provided a machine type communication (MTC) device. The MTC device may comprise: a transceiving unit repeatedly receiving scheduling information regarding a first type system information block (SIB) for the MTC device through physical downlink control channels (PDCCHs) on several subframes; and a processor decoding the scheduling information, determining several subframes in which a physical downlink shared channel (PDSCH) including the first type system information block (SIB) for the MTC device is repeatedly received based on the decoded scheduling information, and receiving and decoding the first type SIB for the MTC device on the determined several subframes.

According to the disclosure of the specification, the problem in the related art is solved.

In more detail, when a machine type communication (MTC) device is located in a coverage expanded area of a base station, the MTC device repeatedly receives system information (e.g., a first type system information block) on multiple subframes and thereafter, combines and decodes the repeatedly received system information to thereby improving a decoding success rate.

BRIEF DESCRIPTION OF THE DRAWINGS

FIG. 6 illustrates the architecture of an uplink subframe in 3GPP LTE.

DESCRIPTION OF EXEMPLARY EMBODIMENTS

Figure 1:
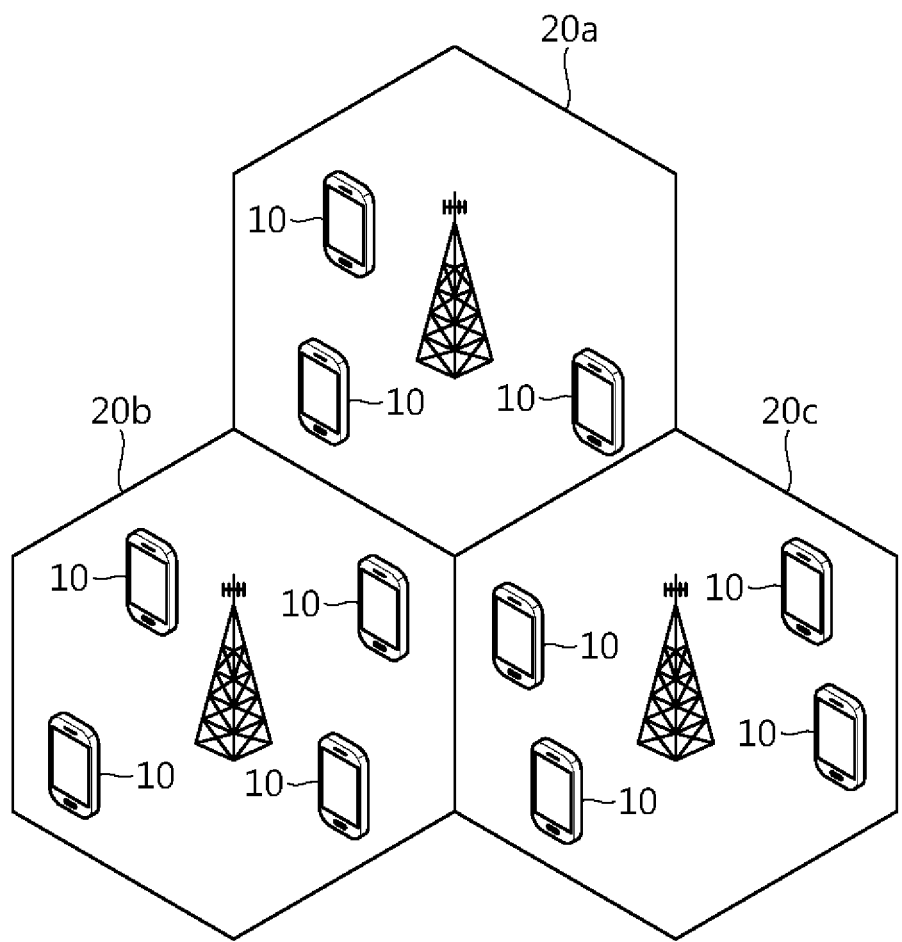
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS(mobile station), UT(user terminal), SS(subscriber station), MT(mobile terminal) and etc.

FIG. 1 Shows a Wireless Communication System.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
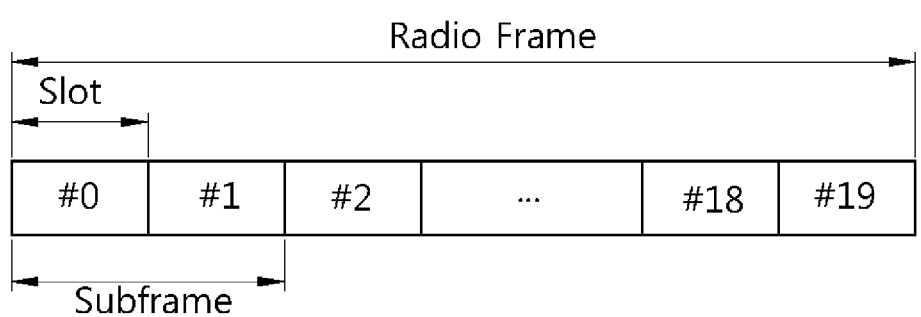
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
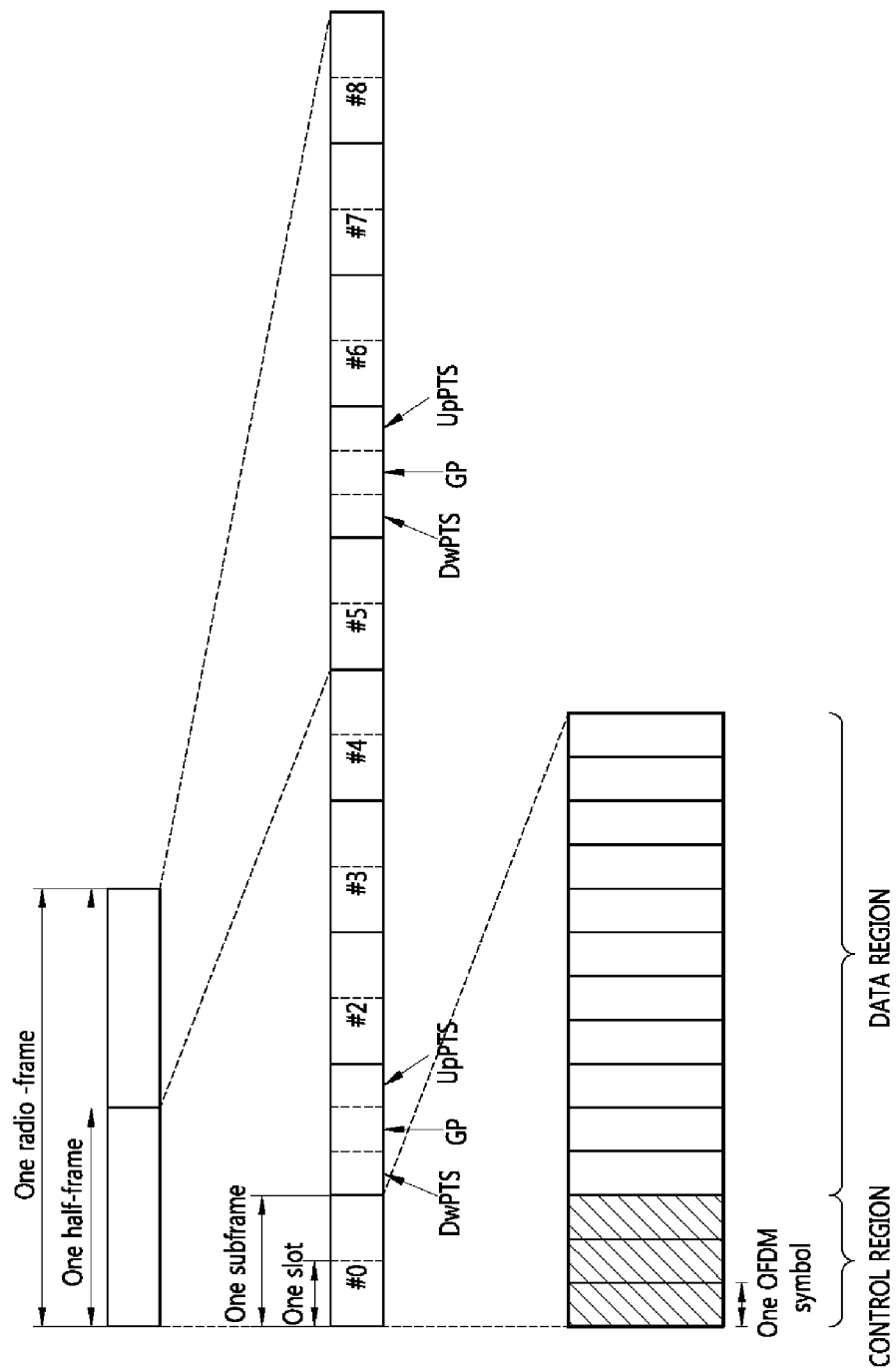
FIG. 3 illustrates the architecture of a downlink radio frame according to time division duplex (TDD) in 3GPP LTE.

FIG. 3 Shows an Example of a Resource Grid for One Uplink or Downlink Slot in 3GPP LTE.

For this, 3GPP TS 36.211 V 10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
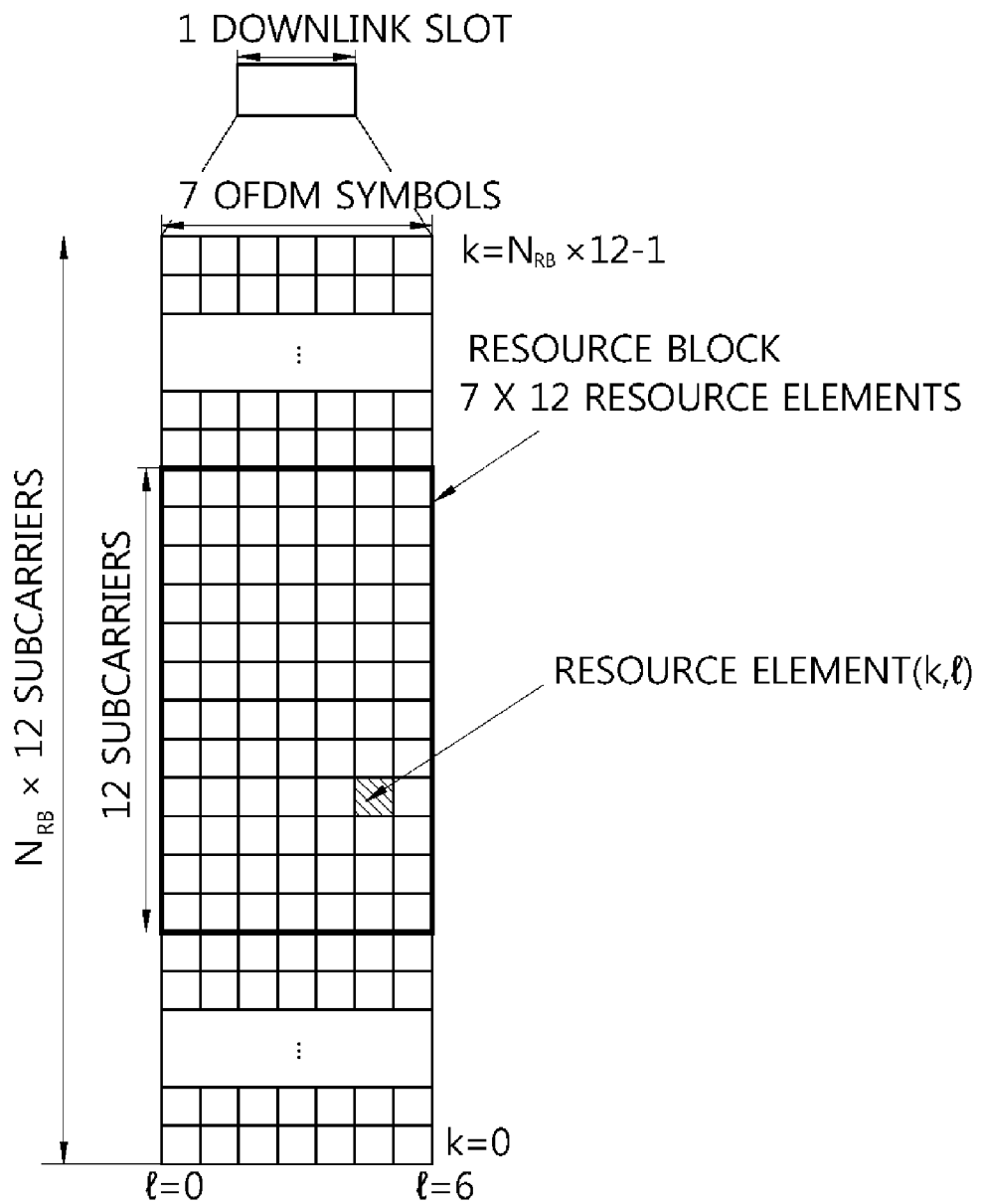
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and $N_{RB}$ resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., $N_{UL}$, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
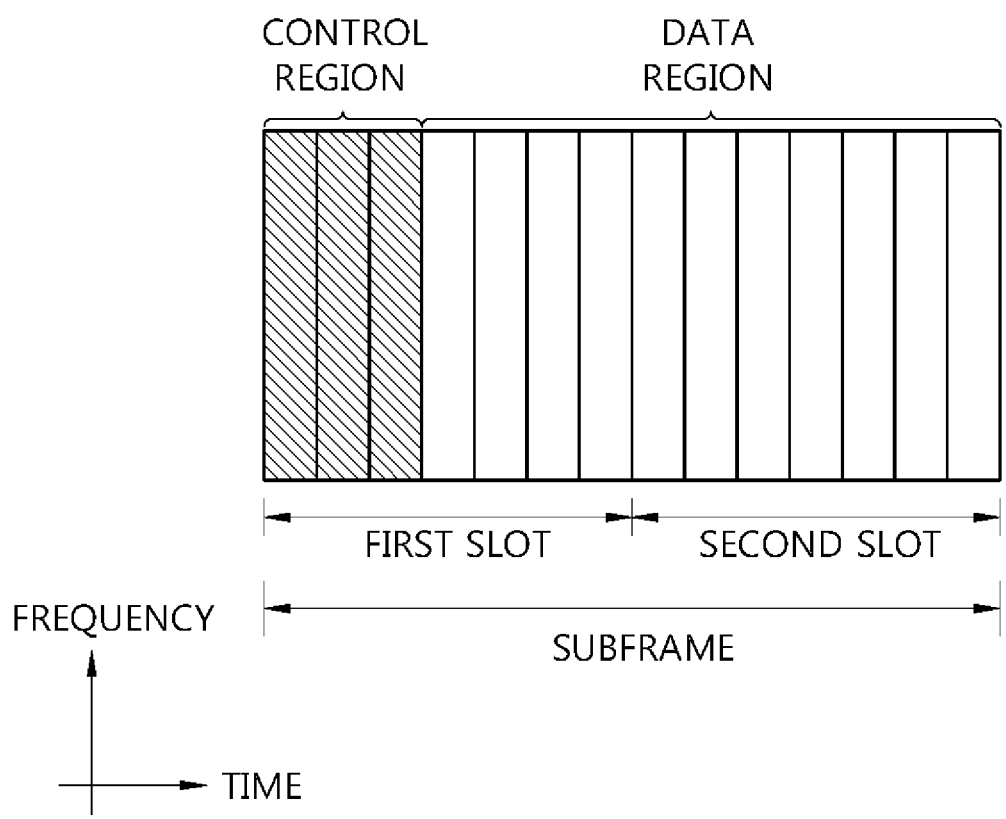
FIG. 5 illustrates the architecture of a downlink subframe.

FIG. 5 Illustrates the Architecture of a Downlink Sub-Frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V 10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SAS (Sounding Reference Signal), and a PRACH (physical random access channel).

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
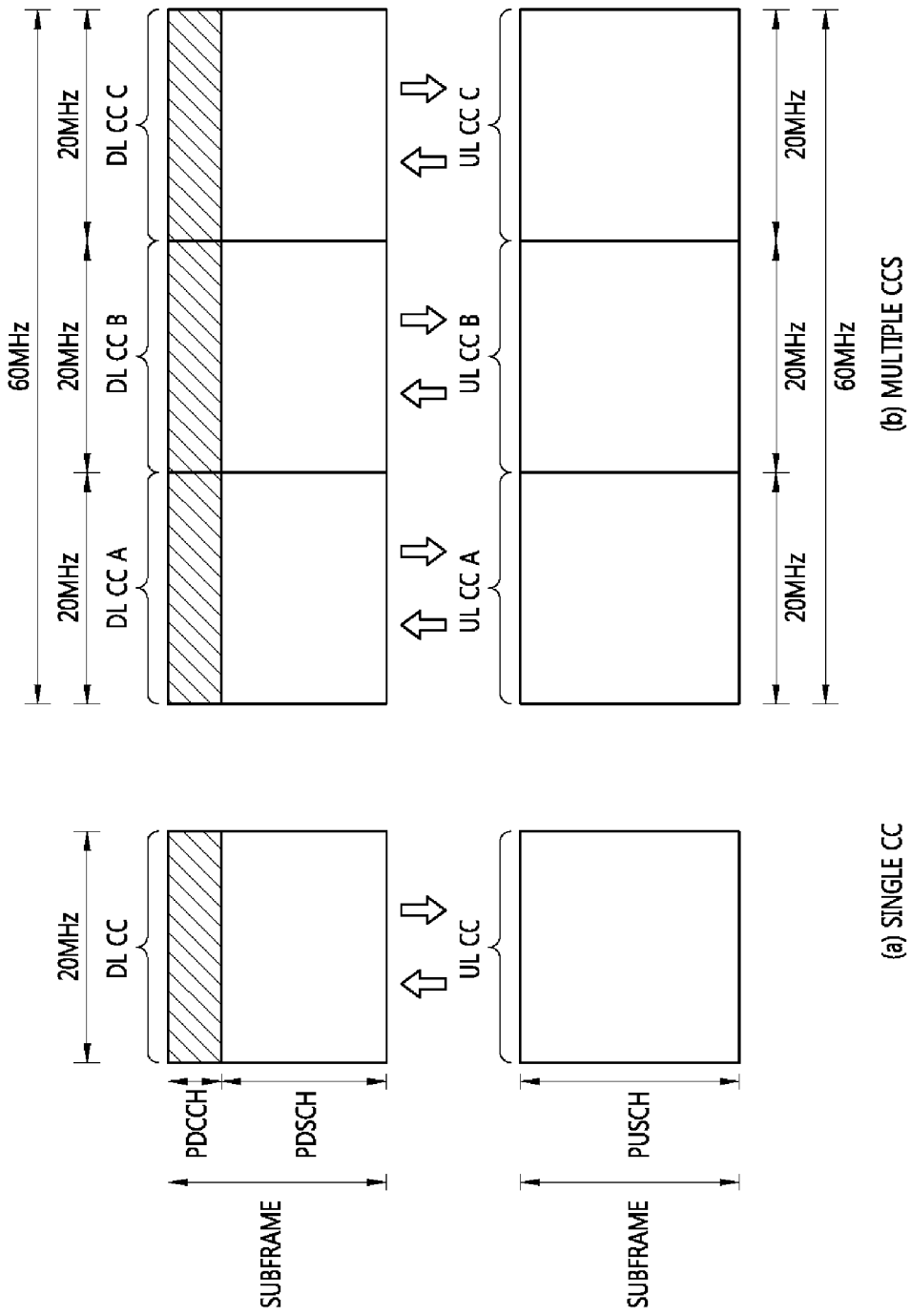
FIG. 7 illustrates an example of comparison between a single carrier system and a carrier aggregation system.

FIG. 7 Illustrates an Example of Comparison Between a Single Carrier System and a Carrier Aggregation System.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
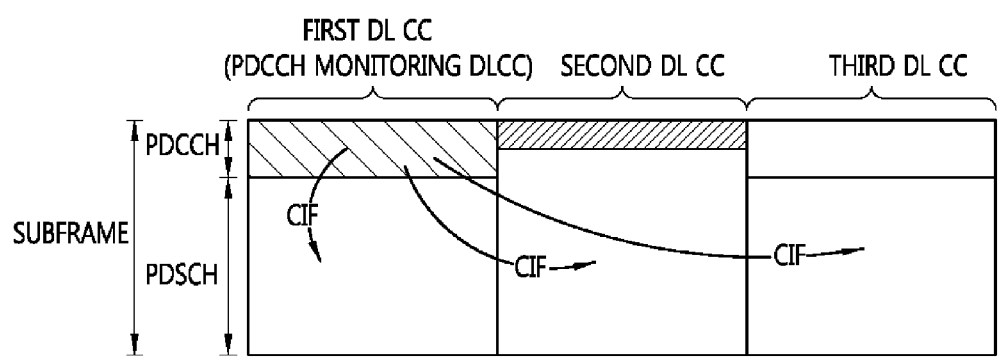
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCHIPUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9A:
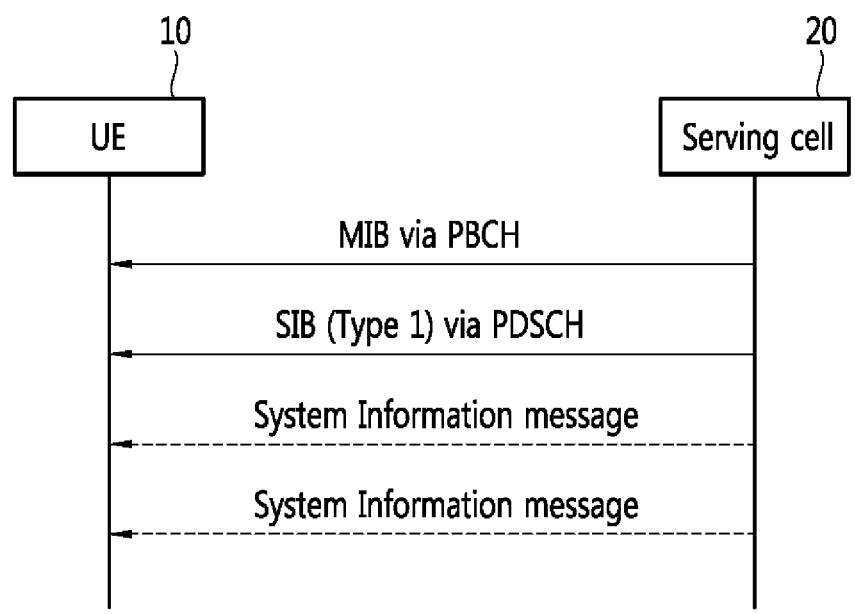
FIG. 9A illustrates one example of transmitting system information.

FIG. 9A illustrates one example of transmitting system information.

The system information is divided into a master information block (MIB) and multiple system information blocks (SIBs). The MIB includes most important physical layer information of a cell. Multiple types of SIBs are provided. A first type SIB includes information used to evaluate whether the UE is permitted to access the cell and moreover, includes scheduling information of other types of SIBs. A second type SIB (SIB type 2) includes common and sharing channel information. A third type SIB (SIB type 3) includes cell reselection information primarily associated with the serving cell. A fourth type SIB (SIB type 4) includes frequency information of the serving cell and intra frequency information of a neighboring cell associated with cell reselection. A fifth type SIB (SIB type 5) includes information on another E-UTRA frequency and inter frequency information of the neighboring cell associated with the cell reselection. A sixth type SIB (SIB type 6) includes information on a UTRA frequency and information on a UTRA neighboring cell associated with the cell reselection. A seventh type SIB (SIB type 7) includes information on a GERAN frequency associated with the cell reselection.

As known with reference to FIG. 9A, the MIB is transferred to the UE 10 on the PBCH.

Moreover, the first type SIB (SIB type 1) is mapped to a DL-SCH to be transferred to the UE 10 on the PDSCH. Other types of SIBs are transferred to the UE on the PDSCH through a system information message.

Figure 9B:
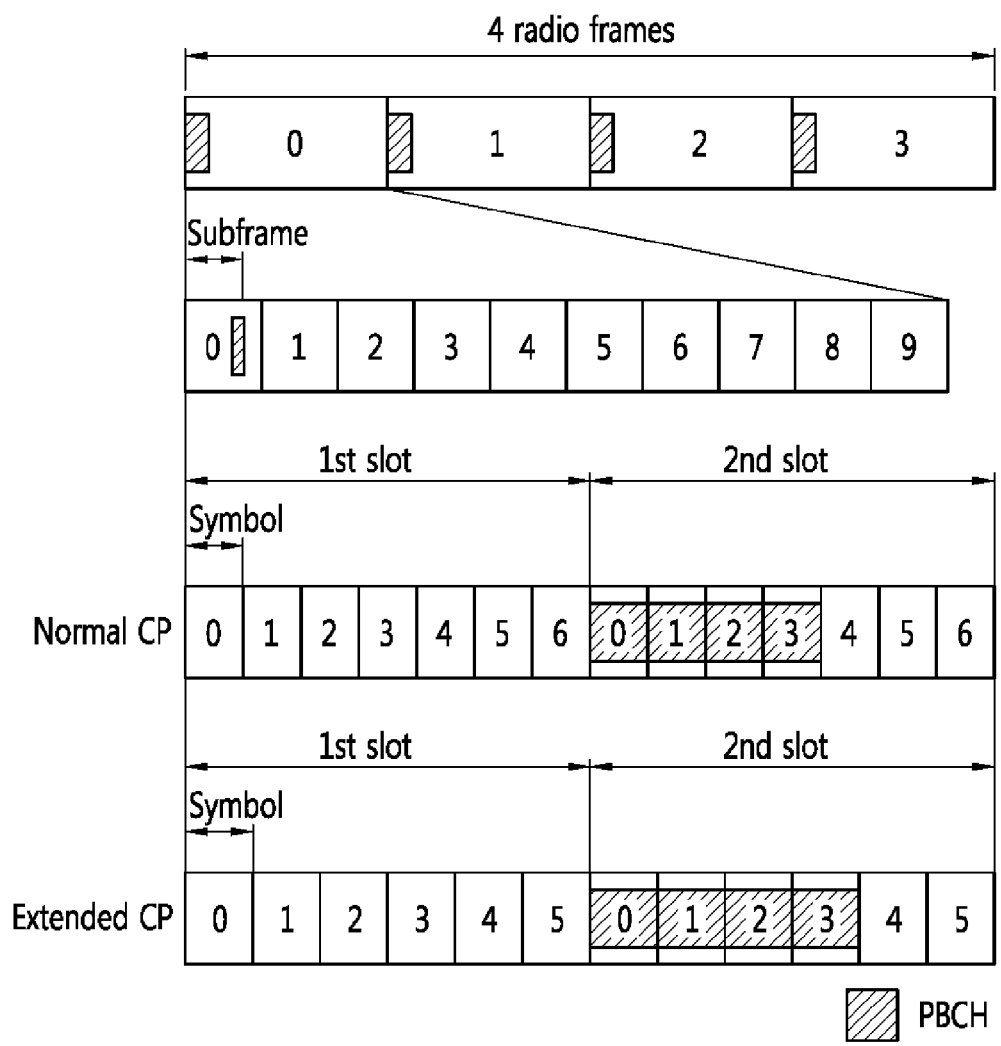
FIG. 9B illustrates a frame structure for a physical broadcast channel (PBCH) in which an MIB is transmitted.

FIG. 9B Illustrates a Frame Structure for a Physical Broadcast Channel (PBCH) in Which an MIB Is Transmitted.

As illustrated in FIG. 9B, the radio frame, the subframe, and the symbol number start from 0. The PBCH is transmitted every radio frame, that is, 10 ms.

Figure 11A:
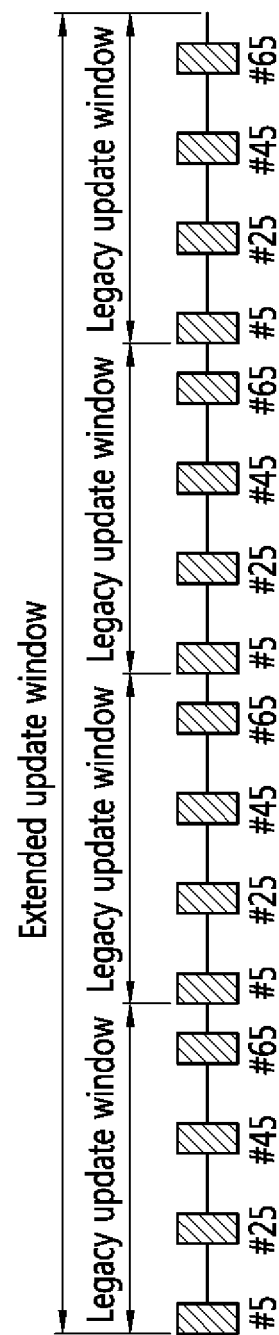
FIG. 11A illustrates one scheme for allowing the MTC device located in a cell coverage expanded area to receive the first type system information block.
Figure 11B:
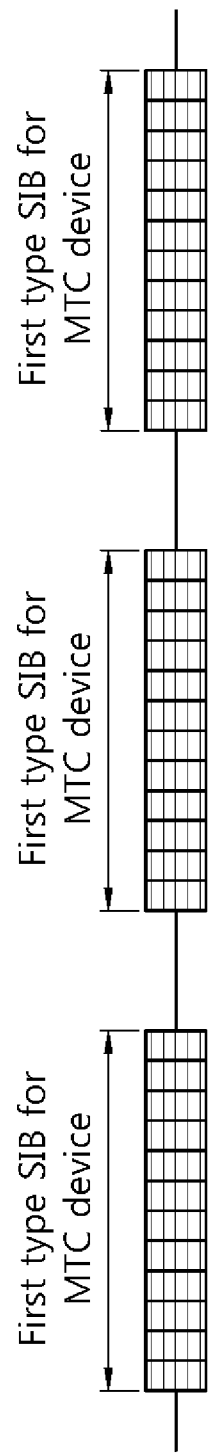
FIG. 11B illustrates another scheme for allowing the MTC device located in the cell coverage expanded area to receive the first type system information block.

As illustrated in FIG. 11B, the PBCH is transmitted on subframe #0 of each radio frame. In more detail, the PBCH is transmitted on symbols #0, 1, 2, and 3 of a second slot.

The PBCH is used for each base station to transmit the most important MIB for operating the system and the MIB information is retransmitted four times per 10 ms at a very low coding rate so that all UEs accessing the corresponding cell receive the NEB information with reliability, thereby enabling receiving the MIB information even under a considerable poor channel environment.

On the other hand, MIB information of a total of 24 bits is defined as follows in TS36.331 of the current LTE standard.

TABLE 2

```
-- ASN1START
MasterInformationBlock ::= SEQUENCE {
    dl-Bandwidth    ENUMERATED {
        n6, n15, n25, n50, n75, n100},
    phich-Config    PHICH-Config,
    systemFrameNumber    BIT STRING (SIZE (8)),
    spare    BIT STRING (SIZE (10))
}
-- ASN1STOP
```

The MIB information is generally transmitted as the predetermined same data every corresponding cell except for a systemFrameNumber field in each transmission and when changing the SIB including the MIB is required due to other reasons, the MIB information is notified to all UEs in the cell through separate paging RRC signaling.

Figure 9C:
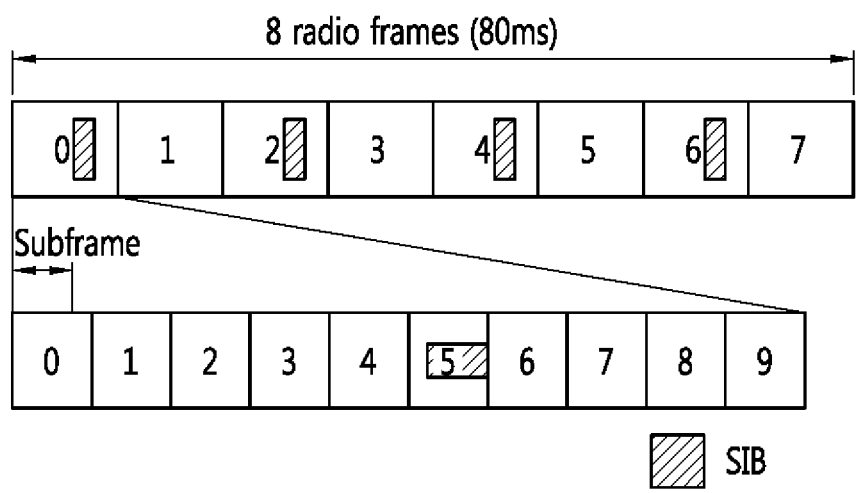
FIG. 9C illustrates a transmission example of a first type system information block on a radio frame.

FIG. 9C Illustrates a Transmission Example of a First Type System Information Block on a Radio Frame.

As known with reference to FIG. 9C, the first type SIB (SIB type 1) is transmitted at a cycle of 8 radio frames (that is, 80 ms cycle) and repeatedly retransmitted on subframe #5 of the radio frame, which satisfies system frame number (SFN) mod 2 in the cycle of 8 radio frames (80 ms).

On the other hand, the first type SIB (SIB type 1) is defined as follows in TS36.331 of the current LTE standard.

TABLE 3

```
-- ASN1START
SystemInformationBlockType1 ::= SEQUENCE {
    cellAccessRelatedInfo    SEQUENCE {
        plmn-IdentityList    PLMN-IdentityList,
        trackingAreaCode    TrackingAreaCode,
        cellIdentity    CellIdentity,
        cellBarred    ENUMERATED {barred, notBarred},
        intraFreqRes election    ENUMERATED allowed, notAllowed},
        csg-Indication    BOOLEAN,
        csg-Identity    CSG-Identity
    },
    cellSelectionInfo    SEQUENCE {
        q-RxLevMin    Q-RxLevMin,
        q-RxLevMinOffset    INTEGER (1..8)
    },
    p-Max    P-Max
    freqBandIndicator    FreqBandIndicator,
    schedulingInfoList    SchedulingInfoList,
    tdd-Config    TDD-Config
    si-WindowLength    ENUMERATED {ms1, ms2, ms5, ms10, ms15, ms20, ms40},
    systemInfoValueTag    INTEGER (0..31),
    nonCriticalExtension    SystemInformationBlockType1-v890-IEs
}
```

Meanwhile, hereinafter, the MTC will be described.

Figure 10A:
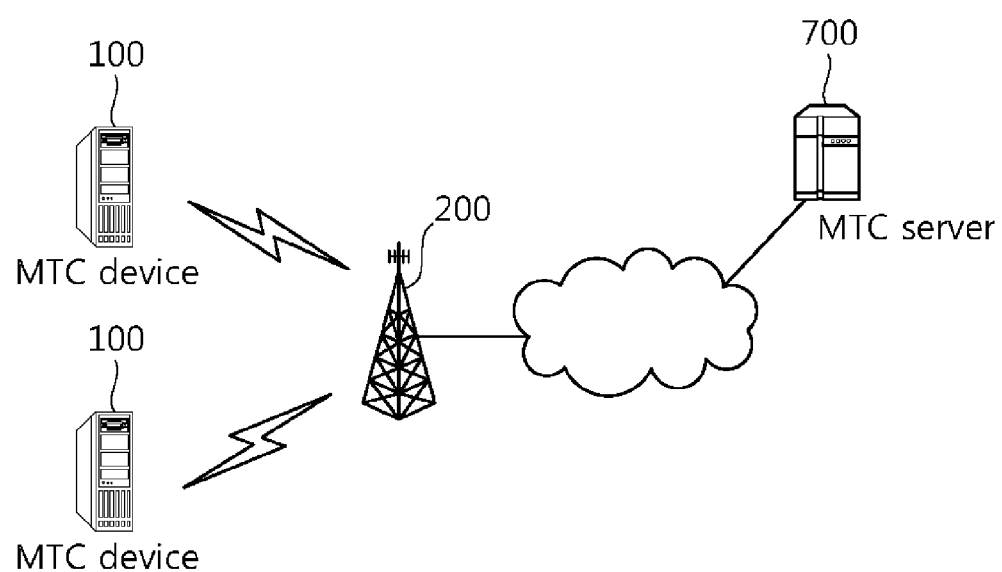
FIG. 10A illustrates one example of machine type communication (MTC).

FIG. 10A Illustrates One Example of Machine Type Communication (MTC).

The machine type communication (MTC) represents an information exchange through a base station 200 among MTC devices, which does not accompany human interaction or an information exchange between the MTC device 100 and an MTC server 700 through the base station.

The MTC server 700 is an entity which communicates with the MTC device 100. The MTC server 700 executes an MTC application and provides an MTC specific service tot eh MTC device.

The MTC device 100 as a wireless device providing MTC may be fixed or movable.

A service provided through the MTC has discrimination from a service in communication in which humans intervene in the related art and various categories of services including tracking, metering, payment, a medical field service, remote control, and the like are provided. In more detail, the service provided through the MTC may include reading of a meter, measurement of a water level, utilization of a monitoring camera, stock management of a vending machine, and the like.

In the case of peculiarities of the MTC device, since a transmission data amount is small and uplink/downlink transmission/reception is often performed, it is efficient to lower a price of the MTC device and reduce battery consumption according to the low data transmission rate. The MTC device has a characteristic in that mobility is low, and as a result, the MTC device has a characteristic in which a channel environment is not almost changed.

Figure 10B:
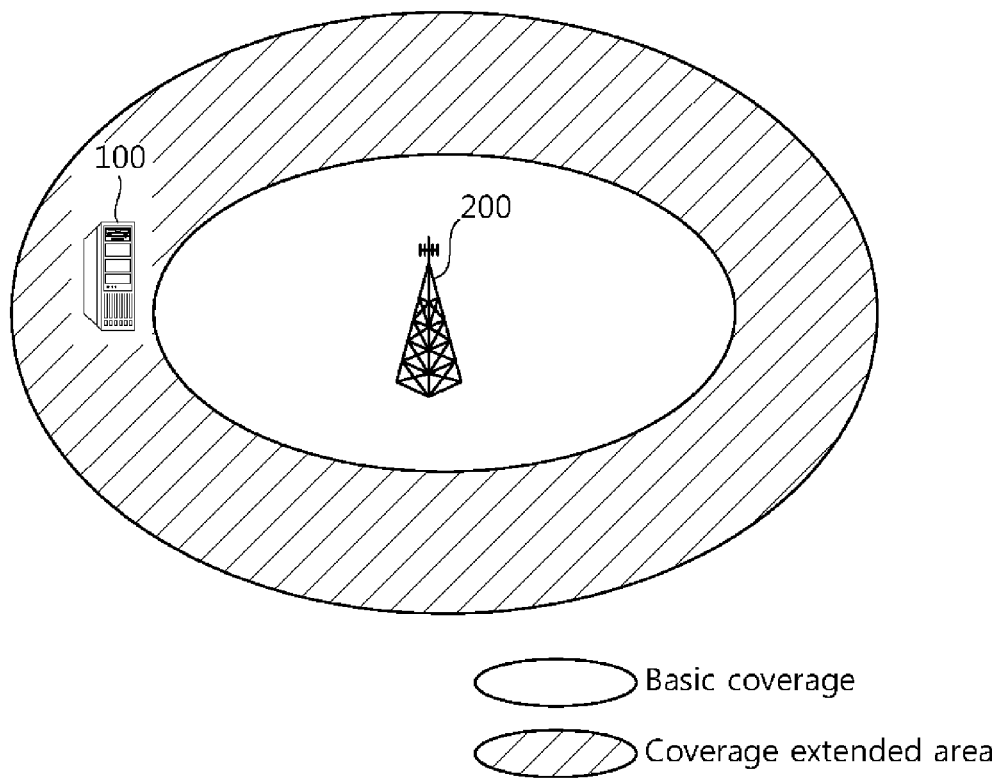
FIG. 10B is an example of cell coverage expansion for an MTC device.

FIG. 10B Is an Example of Cell Coverage Expansion for an MTC Device.

In recent years, expanding cell coverage has been considered for the MTC device and various techniques for expanding the cell coverage has been discussed.

However, in the case where the coverage of the cell is expanded, when the base station transmits the MIB, the SIB, and the like as transmitting the system information to legacy UE, the MTC device located in a cell coverage expanded area has a difficulty in receiving the MIB, the SIB, and the like. In particular, the first type SIB (that is, SIB type 1) may be changed after an update window having a length of 80 ms and the MTC device located in the cell coverage expanded area may not correctly decode the first type SIB (that is, SIB type 1) until the update window ends.

<Disclosures of Present Specification>

Accordingly, the disclosures of the specification have been made in an effort to provide a scheme that solves the problem. In particular, hereinafter, the disclosures of the specification will be described based on the SIB. Further, for easy description, in the specification, the first type SIB (that is, SIB type 1) is primarily described, but is not limited thereto and a core of the specification may be applied even to other types of SIBs.

FIG. 11A Illustrates One Scheme for Allowing the MTC Device Located in a Cell Coverage Expanded Area to Receive the First Type System Information Block (SIB).

In order to solve the problem, instead of the existing update window, that is, 80 ms (8 radio frames) for the first type SIB (that is, SIB type 1) in the related art, the base station uses the expanded update window and may not update information on the first type SIB (that is, SIB type 1) during the expanded update window interval.

When an update window capable of receiving 4 first type SIBs (that is, SIB type 1) in related art is expanded, the MTC device receives first type SIBs (that is, SIB type 1) receives much more first type SIBs (that is, SIB type 1) than 4 first type SIBs and thereafter, combines and decodes the first type SIBs to increase a success probability of decoding. However, when the length of the update window is too large, overhead increases contrary to this, and as a result, it should be careful. For example, when the expanded update window is 25 times longer than the update window in the related art, the MTC device may decode the SIBs at last after receiving the SIBs through approximately 100 subframes, and as a result, the overhead increases. Since SIB type 1 is received four times during 80 ms (that is, 8 radio frames), when after all of first type SIBs (that is, SIB type 1) are received on 100 subframes, the SIBs may be decoded at last, a total of 2000 ms (that is, a total of 200 radio frames) are required. This may be very large overhead in terms of the MTC device. Similarly, it is advantageous in that it takes too much time even for the base station to update the information on the first type SIB (that is, SIB type 1). In order to solve the disadvantage, the expanded SIB update window may be varied by the base station and even before the expanded SIB update window ends, the MTC device may attempt combining and decoding first type SIBs (that is, SIB type 1) received until then.

FIG. 11B Illustrates Another Scheme for Allowing the MTC Device Located in the Cell Coverage Expanded Area to Receive the First Type System Information Block (SIB).

As known with reference to FIG. 13B, the base station (eNodeB) 200 may not transmit the first type SIB (that is, SIB type 1) for the MTC device 100 on subframes #5, 25, 45, and 65 in the update window having the length of 80 ms but repeatedly the first type SIB (that is, SIB type 1) on multiple consecutive subframes (that is, bundling subframe).

As such, when a transmission scheme of the first type SIB (that is, SIB type 1) for the MTC device 100 is different from a transmission scheme for the UE in the related art, a location of a transmission start subframe of the first type SIB (that is, SIB type 1), information on a period of the transmission subframe, and/or information on a transmission AB area of the first type SIB (that is, SIB type 1) may be designated in advance or transferred to the MTC device 100 through the MIB or the RRC signaling. In detail, information on a location of a system frame number (SFN) in which the MTC device 100 may receive the first type SIB (that is, SIB type 1) needs to be notified to the MTC device 100 so as for the MTC device 100 to receive the first type SIB (that is, SIB type 1) with low complexity. The location information of the SFN may be designated in advance or transferred to the MTC device through the MIB or RRC signaling. In this case, when the information is designated in advance, the transmission of the information may be omitted. Alternatively, the information may be expressed through bits which are not currently used but reserved.

Meanwhile, when the first type SIB (SIB type 1) for the MTC device is transmitted on multiple consecutive subframes (that is, bundling subframe), a location of a subframe in which the transmission of the first type SIB (that is, SIB type 1) starts may be determined according to a location where the PBCH is transmitted. In this case, the PBCH may be a PBCH which the legacy UE may also receive, but may be a dedicated PBCH for the MTC device 100 requiring the cell coverage extension (CE). The dedicated PBCH may be called a CE PBCH. In the case where the dedicated PBCH (alternatively, CE PBCH) is received from the base station on multiple consecutive subframes (that is, bundling subframe), a last subframe among the multiple consecutive subframes is referred to as 'subframe n', the location of a subframe where reception of the first type SIB (that is, SIB type 1) for the MTC device 100 starts may be determined as 'subframe n+k' after the subframe where the dedicated PBCH (alternatively, CE PBCH) is received by k subframes. In this case, when a subframe in which the dedicated PBCH (alternatively, CE PBCH) is 'subframe n', the MTC device 100 may assume that the PDCCH in which the CRC is masked with the SI-RNTI is received from 'subframe n+k' from the subframe in which the dedicated PBCH (alternatively, CE PBCH) is received by k subframes. In this case, a value of the k may be a predetermined value. The value of the k may be, for example, 0. Alternatively, the value of the k may be notified to the MTC device through the MIB.

Hereinafter, a scheme for additionally providing the first type SIB (SIB type 1) for the MTC device in addition to the existing first type SIB (SIB type 1) and a scheme for providing only the first type (SIB type 1) newly generated for the MTC device to the MTC device will be described.

Figure 12A:
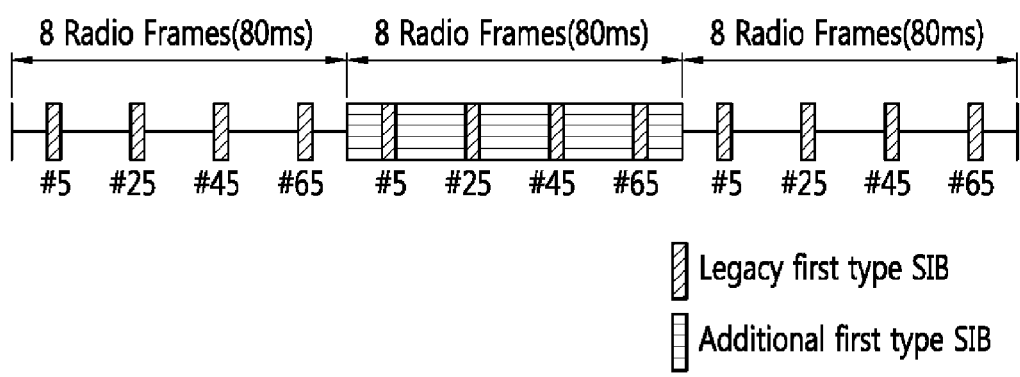
FIGS. 12A to 12C illustrate examples of a scheme for additionally providing a first type SIB for an MTC device in addition to the existing first type system information block.
Figure 12B:
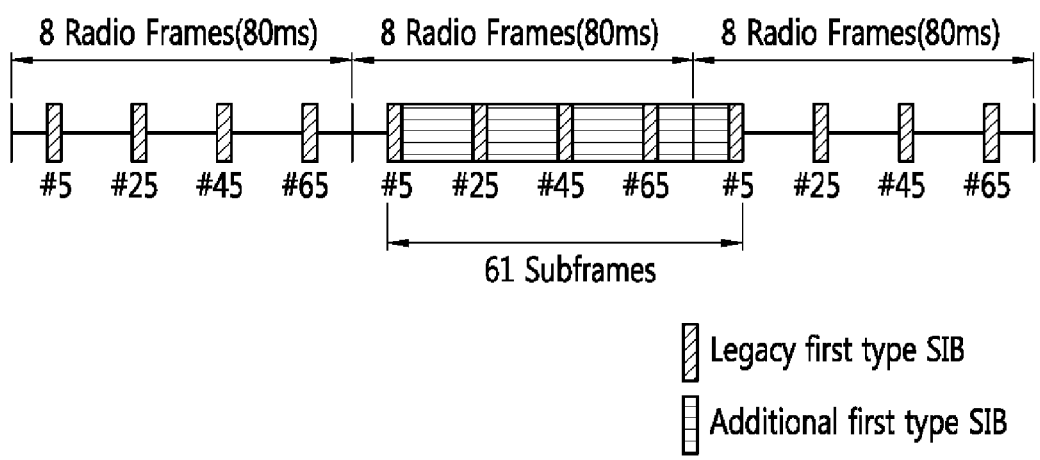
Figure 12C:
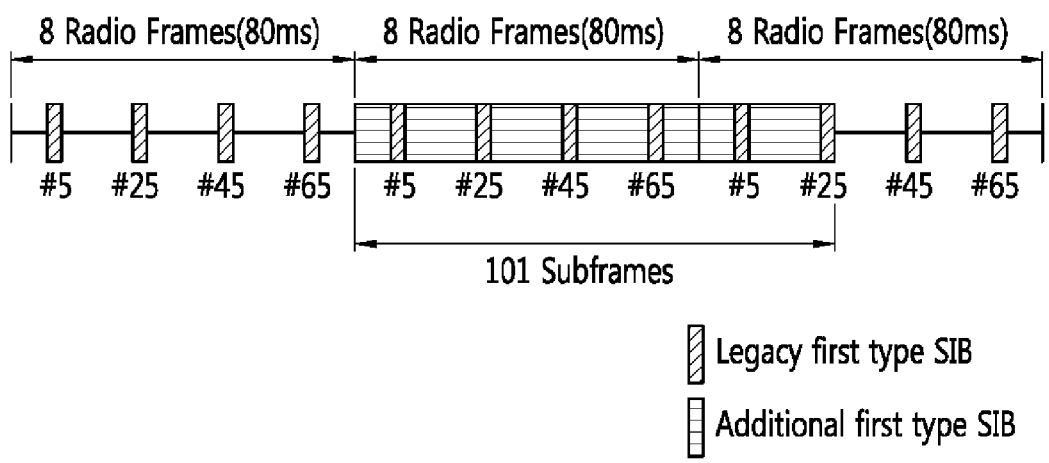

FIGS. 12A to 12C illustrate examples of a scheme for additionally providing a first type SIB (SIB type 1) for an MTC device in addition to the existing first type SIB (SIB type 1).

As known with reference to FIGS. 12A to 12C, the first type SIB (SIB type 1) for the MTC device may be additionally transmitted in addition to the existing first type SIB (SIB type 1) transmitted from the base station to the UE through subframes #5, #25, #45, and #65. In this case, the first type SIB (SIB type 1) for the MTC device may be transmitted on several consecutive subframes (that is, bundling subframe).

Further, by adding the additional first type SIB (SIB type 1) for the MTC device in addition to the existing first type SIB (SIB type 1), subframes occupied by the first type SIB (SIB type 1) among all subframes increase, and as a result, overhead may increase. Therefore, according to the embodiment of the present invention, a cycle at which the additional first type SIB (SIB type 1) for the MTC device is transmitted may be determined as a value larger than 80 msec. Alternatively, the additional first type SIB (SIB type 1) for the MTC device is not transmitted in a general situation and when a specific event occurs (for example, the timing when the MTC device wakes up from a sleep state and needs to receive the SIB is reached), the additional first type SIB (SIB type 1) may be transmitted.

In detail, as known with reference to FIG. 12A, when the subframes are numbered based on the cycle of 80 msec when the existing first type SIB (SIB type 1) is transmitted, the additional first type SIB (SIB type 1) may be transmitted through all or some subframes of 80 consecutive subframes of subframe #0 to subframe #79. In this case, the additional first type SIB (SIB type 1) is transmitted through residual subframes other than the location of the subframe in which the existing first type SIB (SIB type 1) is transmitted.

Alternatively, as known with reference to FIG. 12B, when the subframes are numbered based on the cycle of 80 msec when the existing first type SIB (SIB type 1) is transmitted, the additional first type SIB (SIB type 1) may be transmitted through all or some subframes of 61 consecutive subframes of subframe #25 to subframe #5. As a detailed example, the additional first type SIB (SIB type 1) is transmitted through 59 consecutive subframes of subframe #26 to subframe #5.

Alternatively, as known with reference to FIG. 12C, when the subframes are numbered based on the cycle of 80 msec when the existing first type SIB (SIB type 1) is transmitted, the additional first type SIB (SIB type 1) may be transmitted through all or some subframes of 101 consecutive subframes of subframe #25 to subframe #25. In this case, the additional first type SIB (SIB type 1) is transmitted through residual subframes other than the subframe in which the existing first type SIB (SIB type 1) is transmitted.

The illustration of FIGS. 12A to 12C is just an example and the additional first type SIB (SIB type 1) may be transmitted through consecutive subframes at different locations.

Meanwhile, it is described above that the additional first type SIB (SIB type 1) is transmitted through several consecutive subframes (that is, bundling subframes), but in the example illustrated in FIGS. 12A to 12C, since the existing first type SIB (SIB type 1) is present among several subframes in which the additional first type SIB (SIB type 1) is transmitted, the additional first type SIB (SIB type 1) is transmitted through the consecutive subframes and some inconsecutive subframes.

Figure 13:
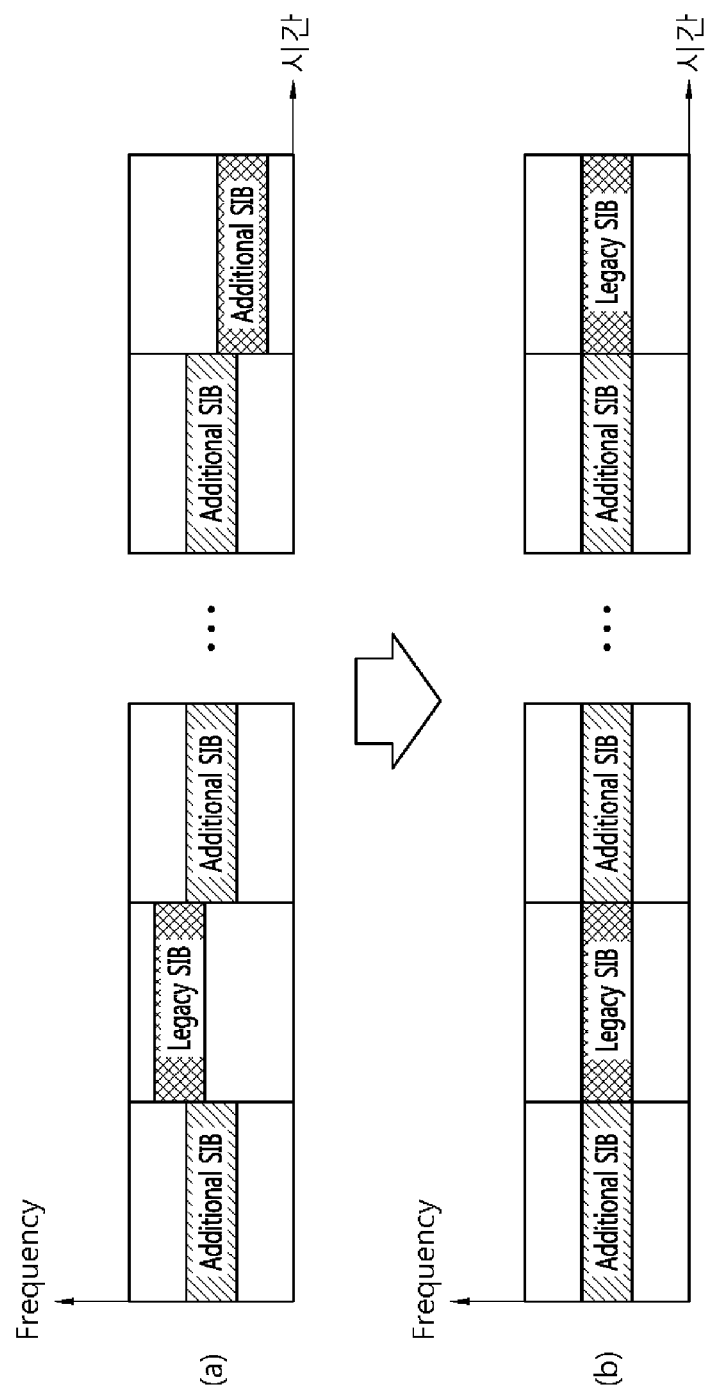
FIG. 13 is an exemplary diagram illustrating a radio resource in which an additional first type system information block for the MTC device is transmitted in addition to the existing first type system information block in terms of a frequency.

FIG. 13 is an exemplary diagram showing a radio resource in which an additional first type SIB (SIB type 1) for the MTC device is transmitted in addition to the existing first type SIB (SIB type 1).

As shown in FIG. 13A, a location of an RB area in which the existing first type SIB (SIB type 1) is transmitted and a location of an RB area in which the additional first type SIB (SIB type 1) is transmitted may be different from each other. The reason is that the RB area in which the existing first type SIB (SIB type 1) is to be transmitted and the RB area in which the additional first type SIB (SIB type 1) is to be transmitted may be independently scheduled and fragmented. In this case, the MTC device may know information on the location of the RB in which the additional first type SIB (SIB type 1) is transmitted, but not know information on the location in which the existing first type SIB (SIB type 1) is transmitted, there is a possibility that the MTC will not normally receive the existing first type SIB.

As shown in FIG. 13B, in the embodiment of the present invention, when the additional first type SIB (SIB type 1) for he MTC device is transmitted in a period in which the existing first type SIB (SIB type 1) is transmitted, a PDSCH including the existing first type SIB (SIB type 1) is transmitted through center 6 RBs of the system bandwidth. Alternatively, when the location of the RB area in which the additional first type SIB (SIB type 1) is transmitted is determined, the existing first type SIB (SIB type 1) may be transmitted through an RB area at a frequency location which is the same as a frequency location of the RB area in which the additional first type SIB (SIB type 1) is transmitted.

Figure 14A:
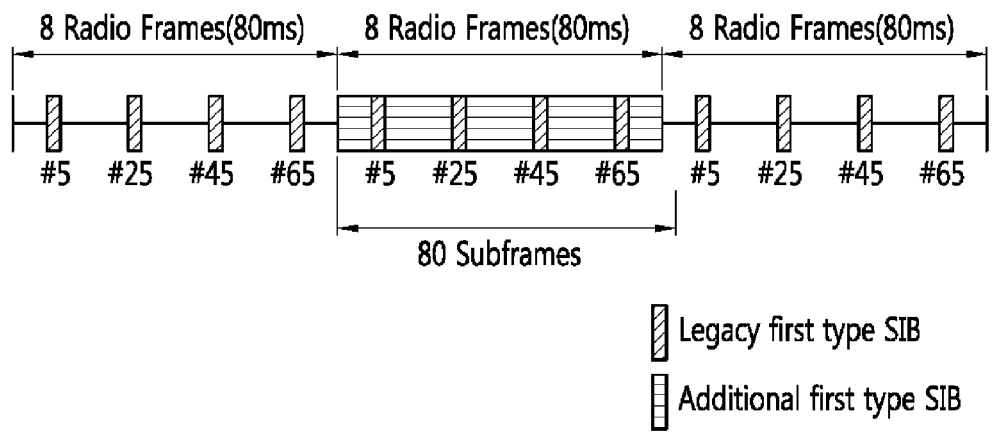
FIGS. 14A and 14B illustrate an example of a scheme for providing a first type system information block newly generated for the MTC device.
Figure 14B:
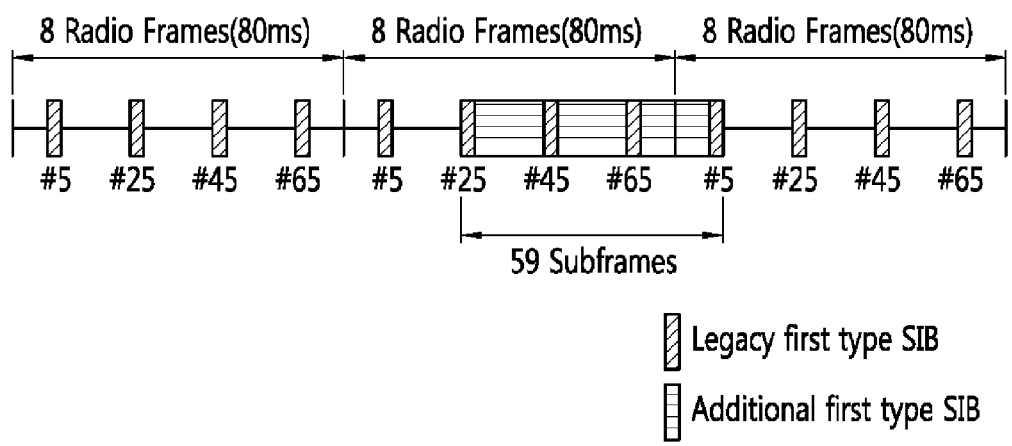

FIGS. 14A and 14B show an example of a scheme for providing a first type SIB newly generated for the MTC device.

As schematically introduced as above, only the first type SIB (SIB type 1) newly generated for the MTC device may be provided to the MTC device. That is, apart from the existing first type SIB (SIB type 1) transmitted through subframes #5, #25, #45, and #65 at the cycle of 80 msec, the new first type SIB (SIB type 1) for the MTC device may be generated and the MTC device may receive not the existing first type SIB (SIB type 1) but only the new first type SIB (SIB type 1). The new first type SIB (SIB type 1) may be transmitted on several consecutive/inconsecutive subframes.

By generating the new first type SIB (SIB type 1) for the MTC device in addition to the existing first type SIB (SIB type 1), subframes occupied by the first type SIB (SIB type 1) among all subframes increase, and as a result, the overhead may increase. Therefore, according to the embodiment of the present invention, a cycle at which the new first type SIB (SIB type 1) for the MTC device is transmitted may be determined as a value larger than 80 msec. Alternatively, the new first type SIB (SIB type 1) for the MTC device is not transmitted in the general situation and when a specific event occurs (for example, the timing when the MTC device wakes up from the sleep state and needs to receive the SIB is reached), the new first type SIB (SIB type 1) for the MTC device may be transmitted.

In more detail, as known with reference to FIG. 14A, when the subframes are numbered based on the cycle of 80 msec when the existing first type SIB (SIB type 1) is transmitted, the new first type SIB (SIB type 1) for the MTC device may be transmitted through all or some subframes of 80 consecutive subframes of subframe #0 to subframe #79.

Alternatively, as shown in FIG. 14B, the new first type SIB (SIB type 1) may be transmitted through all some subframes of 59 consecutive subframes of subframes #26 to #4.

The illustration of FIGS. 14A and 14B is just an example and the additional first type SIB (SIB type 1) may be transmitted through consecutive subframes at different locations.

Meanwhile, in order for the base station to transmit the first type SIB (that is, SIB type 1) for the MTC device requiring the coverage extension (CE), first, the base station needs to transfer the PDCCH including the scheduling information to the MTC device. In this case, the CRC of the PDCCH containing the scheduling information for the PDSCH including the first type SIB (that is, SIB type 1) for the MTC device may be masked with the SI-RNTI. Therefore, hereinafter, a relationship between the first type SIB (SIB type 1) for the MTC device and the PDCCH will be described.

Figure 15A:
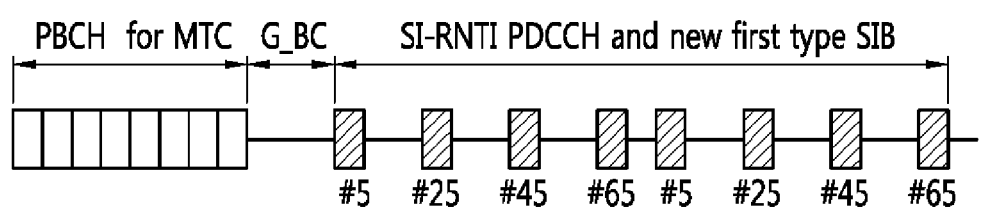
FIGS. 15A to 15C illustrate a relationship between the first type SIB for the MTC device and the PDCCH.
Figure 15B:
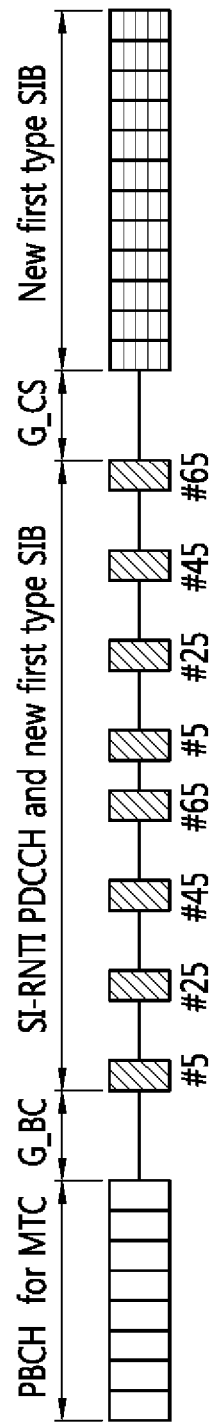
Figure 15C:
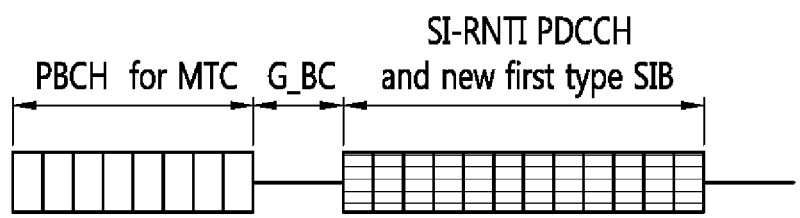

FIGS. 15A to 15C show a relationship between the first type SIB for the MTC device and the PDCCH.

As known with reference to FIGS. 15A to 15C, the PDCCH and the PDSCH including the first type SIB (SIB type 1) may be transmitted through several consecutive subframes or inconsecutively by using a specific subframe location.

In detail, as known with reference to FIG. 15A, the PDCCH containing the scheduling information of the first type SIB (SIB type 1) for the MTC device and the PDSCH containing the first type SIB (SIB type 1) for the MTC device may be simultaneously transmitted on specific subframes. Herein, the specific subframes may be subframes #5, #25, #45, and #65 in which the existing first type SIB (SIB type 1) is transmitted. In detail, when the PDSCCH in which the CRC is masked with the SI-RNTI and the PDSCH in which the first type SIB (SIB type 1) for the MTC device is transmitted are transmitted during a specific period, that is, dur_SIB, the base station needs to continuously transmit the PDCCH in which the CRC is masked with the SI-RNTI and the first type SIB (SIB type 1) to the MTC device at the specific subframe location (for example, subframes #5, #25, #45, and #65 in which the existing first type SIB (SIB type 1) is transmitted) during dur_SIB.

In this case, when the PBCH is also transmitted on several subframes (that is, bundling subframes) for the MTC device, a subframe interval from a last subframe among the several subframes to a location of the subframe in which transmission of the PDCCH and the first type SIB (SIB type 1) starts may be G BC. The value of G BC may be continuously fixed to 0. In this case, the value of the G_BC may be a predetermined value. The value of the G_BC may be, for example, 0. Alternatively, the value of the G_BC may be notified to the MTC device through the MIB.

Unlike this, as known with reference to FIG. 15B, the PDCCH containing the scheduling information of the first type SIB (SIB type 1) for the MTC device and the PDSCH containing the first type SIB (SIB type 1) for the MTC device may be simultaneously transmitted on different subframes. In detail, the PDCCH in which the CRC is masked with the SI-RNTI may be transmitted through specific subframes (for example, subframes #5, #25, #45, and #65 in which the existing first type SIB (SIB type 1) is transmitted) during a specific period and thereafter, the first type SIB (SIB type 1) may be transmitted through several consecutive subframes during the specific period.

When a specific period in which the PDCCH in which the CRC is masked with the SI-RNTI is transmitted is dur_P-

DCCH and a specific period in which the PDSCH containing the first type SIB (SIB type 1) is transmitted is dur_SIB, the base station may continuously transmit the PDCCH in which the CRC is masked with the SI-RNTI on the specific subframes during dur_PDCCH. Thereafter, the base station may transmit the PDSCH containing the first type SIB (SIB type 1) for the MTC device through consecutive subframes during dur_SIB. In this case, the scheduling information regarding the first type SIB (SIB type 1) is contained in the PDCCH transmitted during dur_PDCCH. Herein, a subframe interval between a location of a subframe in which transmission of the PDCCH starts and a location of a subframe in which transmission of the first type SIB (SIB type 1) starts may be G_CS. The value of the G_CS may be, for example, 0. In this case, when the base station transmits the PDCCH on specific subframes during dur_PDCCH, the base station may continuously transmit the first type SIB (SIB type 1) corresponding to the PDCCH to the MTC device in the corresponding subframe together.

Therefore, the MTC device may know that the PDCCH in which the CRC is masked with the SI-RNTI is continuously received on the specific subframes during dur_PDCCH. Further, the MTC device may receive the PDCCH on a predetermined subframe during the corresponding period and acquire the scheduling information of the first type SIB (SIB type 1). Thereafter, the MTC device may know that the PDSCH including information on the first type SIB (SIB type 1) is received with a gap of G_CS subframes on every subframe during dur_SIB. Subsequently, the MTC device may receive the PDSCH transmitted during dur_SIB by using the scheduling information of the first type SIB (SIB type 1) acquired through the PDCCH and acquire the first type SIB (SIB type 1) through the received PDSCH.

When the PBCH is also transmitted on several subframes (that is, bundling subframes) for the MTC device, an interval from the last subframe among the several subframes to the subframe in which transmission of the PDCCH and the first type SIB (SIB type 1) starts may be G_BC. In this case, the value of the G_BC may be, for example, 0.

Unlike this, as known with reference to FIG. 15C, the PDCCH containing the scheduling information of the first type SIB (SIB type 1) and the PDSCH containing the first type SIB (SIB type 1) may be transmitted on several consecutive subframes during a specific period. Herein, when a specific period in which the PDCCH in which the CRC is masked with the SI-RNTI and the PDSCH containing the first type SIB (SIB type 1) are transmitted is dur_SIB, the bases station may transmit the PDCCH containing the scheduling information regarding the first type SIB (SIB type 1) and the PDSCH containing the SIB through several consecutive subframes during dur_SIB.

Therefore, the MTC device may assume that the PDCCH in which the CRC is masked with the SI-RNTI and the first type SIB (SIB type 1) are transmitted through several consecutive subframes during dur_SIB. The MTC device receives the PDCCH and the PDSCH in the subframe transmitted during the corresponding period to acquire the first type SIB (SIB type 1).

When the PBCH is also transmitted on several subframes (that is, bundling subframes) for the MTC device, an interval from the last subframe among the several subframes to the subframe in which transmission of the PDCCH and the first type SIB (SIB type 1) starts may be G_BC.

Meanwhile, in FIGS. 15A to 15C, it is shown that the PDCCH including the scheduling information regarding the first type SIB (SIB type 1) for the MTC is masked with the SI-RNTI, but although the PDCCH is not masked with the SI-RNTI, when the corresponding PDCCH includes the scheduling information regarding the first type SIB (SIB type 1) for the MTC, the aforementioned contents may be applied. Meanwhile, in FIGS. 15A, 15B, and 15C, the existing first type SIB (SIB type 1) and the new first type SIB (SIB type 1) are distinguished and illustrated, but the aforementioned contents may be applied to not the new type SIB (SIB type 1) but even the existing first type SIB (SIB type 1).

On the other hand, when the first type SIB (additional first type SIB or new first type SIB) for the MTC device is transmitted through the consecutive subframes, the first type SIB for the MTC device is configured to be transmitted on the same subframe and the same RB area as another channel in the related art, and as a result, a conflict may occur.

Hereinafter, it will be described which channel may conflict with the first type SIB for the MTC device and each solving scheme will be described.

First, among examples of the first type SIB for the MTC device, when the new first type SIB is configured to be transmitted in the same subframe and the same RB area as the existing first type SIB to conflict with the existing first type SIB, the base station may not transmit the existing first type SIB in the subframe in which the new first type SIB is transmitted. Referring to the example shown in FIG. 13A, when it is assumed that transmission of the existing first type SIB and transmission of the new first type SIB conflict with each other on subframes #5, #25, #45, and #65, according to the embodiment of the present invention, the base station may transmit not the existing first type SIB but only the new first type SIB on subframes #5, #25, #45, and #65. On the contrary, the base station may transmit not the new first type SIB but the existing first type SIB on subframes #5, #25, #45, and #65. In this case, the MTC device receives the new first type SIB through subframes other than subframes #5, #25, #45, and #65.

Second, among examples of the first type SIB for the MTC device, when the new first type SIB is configured to be transmitted in the same subframe and the same RB area as the existing first type SIB to conflict with the existing first type SIB, the confliction may be avoided by differently adjusting the location of the RB in which the new first type SIB is transmitted and the location of the RB in which the existing first type SIB is transmitted. Hereinafter, this will be described with reference to FIG. 15.

Figure 16:
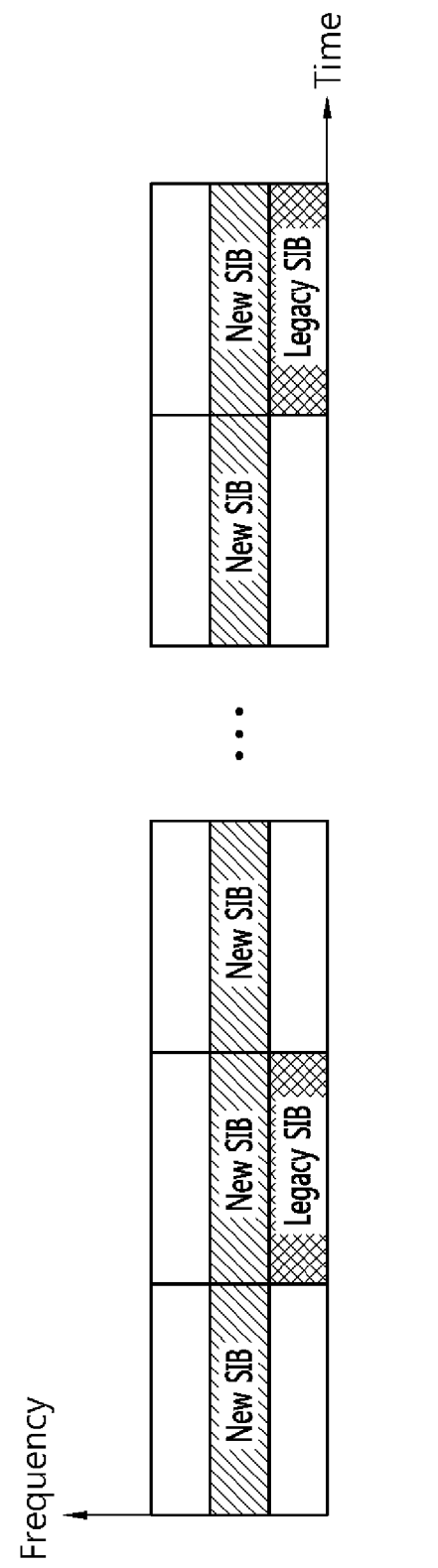
FIG. 16 illustrates one example for avoiding a confliction between the first type SIB for the MTC device and the existing first type.

FIG. 16 Shows One Example for Avoiding a Confliction Between the First Type SIB for the MTC Device and the Existing First Type.

As known with reference to FIG. 16, when it is assumed that the new first type SIB is transmitted on a center area (for example, center 6 RBs) of the system bandwidth, the base station transmits the existing first type SIB on an area other than the center area.

The aforementioned embodiments of the present invention can be implemented through various means. For example, the embodiments of the present invention can be implemented in hardware, firmware, software, combination of them, etc. Details thereof will be described with reference to the drawing.

Figure 17:
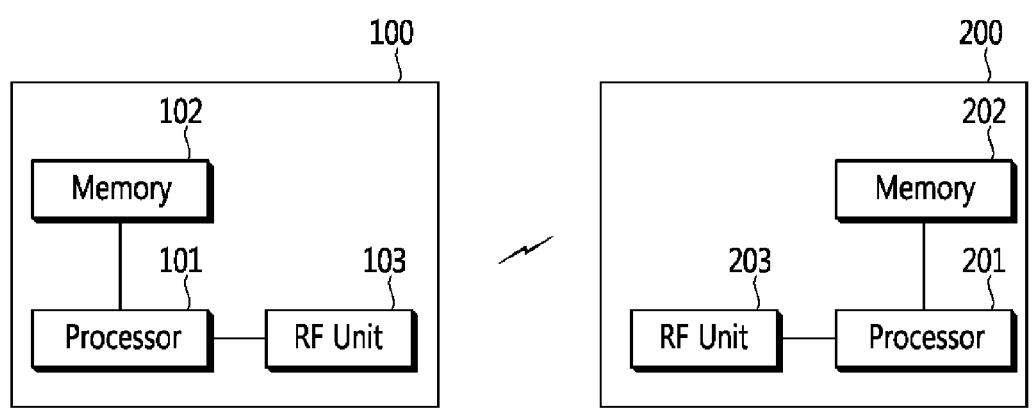
FIG. 17 is a block diagram illustrating a wireless communication system in which an embodiment of the present invention is implemented.

FIG. 17 is a Block Diagram Illustrating a Wireless Communication System According to an Embodiment of the Present Invention.

The base station (BS) includes processor, memory 202, and radio frequency (RF) unit 203. The memory 202 coupled with the processor 201 stores a variety of information for driving the processor 201. The RF unit 203 coupled to the processor 201 transmits and/or receive radio signals.

The processor 201 implements the proposed functions, procedures, and/or methods. In the aforementioned embodiment, an operation of the BS may be implemented by the processor 201.

The MTC device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for receiving system information, the method performed by a machine type communication (MTC) device and comprising:
    repeatedly receiving, by the MTC device from a base station, control information through physical downlink control channels (PDCCHs) on several subframes;
    decoding the control information which includes scheduling information regarding a plurality of first type system information blocks (SIBs) for the MTC device;
    determining multiple successive subframes which receive the plurality of first type SIBs through physical downlink shared channels (PDSCHs) based on the control information;
    receiving, by the MTC device from the base station, the plurality of first type SIBs for the MTC device on the multiple successive subframes through the PDSCHs based on the scheduling information; and
    decoding the plurality of first type SIBs for the MTC device on the multiple successive subframes,
    wherein a subframe for receiving the plurality of first type SIBs for the MTC device is started after a plurality of gap subframes from a last subframe on which the control information is repeatedly received.

2. The method of claim 1, wherein each first type SIB of the plurality of first type SIBs for the MTC device includes additional information in addition to information included in a first type SIB for a legacy user equipment (UE).

3. The method of claim 1, further comprising:
    repeatedly receiving and decoding a master information block (MIB) through physical broadcast channels (PBCHs) on several subframes.

4. The method of claim 3, wherein after a predetermined period from a last subframe among several subframes in which the MIB is received, the scheduling information and the plurality of first type SIBs are simultaneously received on several inconsecutive subframes.

5. The method of claim 3, wherein the scheduling information is received on several subframes after a first period from the last subframe among several subframes in which the MIB is received and the plurality of first type SIBs are received on several subframes after a second period from a last subframe among several subframes in which the scheduling information is received.

6. The method of claim 3, wherein after a predetermined period from the last subframe among several subframes in which the MIB is received, the scheduling information and the plurality of first type SIBs are simultaneously received on several consecutive subframes.

7. The method of claim 1, further comprising:
    receiving a first type SIB for a legacy user equipment (UE),
    wherein, in the decoding of the plurality of first type SIBs for the MTC device, the first type SIB for the legacy UE and the plurality of first type SIBs for the MTC device are combined and decoded.

8. The method of claim 1, further comprising:
    receiving a first type SIB for a legacy user equipment (UE),
    wherein the plurality of first type SIBs for the MTC device and the first type SIB for the legacy UE are received on different resource blocks (RBs) on the same subframes.

9. A machine type communication (MTC) device, comprising:
    a transceiver configured to:
        repeatedly receive, from a base station, scheduling information regarding a plurality of first type system information blocks (SIBs) for the MTC device through physical downlink control channels (PDCCHs) on several subframes, and
        receive, from the base station, the plurality of first type SIBs for the MTC device on multiple successive subframes through physical downlink shared channels (PDSCHs) based on the scheduling information; and
    a processor configured to:
        decode the scheduling information,
        determine the multiple successive subframes which receive the plurality of first type SIBs for the MTC device based on the decoded scheduling information, and
        decode the plurality of first type SIBs for the MTC device on the multiple successive subframes,
    wherein a subframe for receiving the plurality of first type SIBs for the MTC device is started after a plurality of gap subframes from a last subframe on which the control information is repeatedly received.

10. The MTC device of claim 9, wherein the processor repeatedly receives and decodes a master information block (MIB) through physical broadcast channels (PBCHs) on several subframes.

11. The MTC device of claim 10, wherein after a predetermined period from a last subframe among several subframes in which the MIB is received, the scheduling information and the plurality of first type SIBs are simultaneously received on several inconsecutive subframes.

12. The MTC device of claim 10, wherein the scheduling information is received on several subframes after a first period from the last subframe among several subframes in which the MIB is received and the plurality of first type SIBs are received on several subframes after a second period from a last subframe among several subframes in which the scheduling information is received.

13. The MTC device of claim 10, wherein after a predetermined period from the last subframe among several subframes in which the MIB is received, the scheduling information and the plurality of first type SIBs are simultaneously received on several consecutive subframes.

14. The MTC device of claim 9, wherein:
the transceiver additionally receives a first type SIB for a legacy user equipment (UE), and
the processor combines and decodes the first type SIB for the legacy UE and the plurality of first type SIBs for the MTC device.

15. The MTC device of claim 9, wherein:
the transceiver additionally receives a first type SIB for a legacy user equipment (UE), and
the plurality of first type SIBs for the MTC device and the first type SIB for the legacy UE are received on different resource blocks (RBs) on the same subframes.

* * * * *